(12) United States Patent
Haverkate et al.

(10) Patent No.: US 10,770,756 B2
(45) Date of Patent: Sep. 8, 2020

(54) METHOD OF MANUFACTURING A LITHIUM BATTERY

(71) Applicant: Nederlandse Organisatie voor toegepast-natuurwetenschappelijk onderzoek TNO, 's-Gravenhage (NL)

(72) Inventors: Lucas Augustinus Haverkate, Utrecht (NL); Sandeep Unnikrishnan, Veldhoven (NL); Dorothee Christine Hermes, Herten (NL)

(73) Assignee: Nederlandse Organisatie voor toegepast-natuurwetenschappelijk onderzoek TNO, 's-Gravenhage (NL)

(*) Notice: Subject to any disclaimer, the term of this patent is extended or adjusted under 35 U.S.C. 154(b) by 96 days.

(21) Appl. No.: 16/312,106

(22) PCT Filed: Jun. 22, 2017

(86) PCT No.: PCT/NL2017/050417
§ 371 (c)(1),
(2) Date: Dec. 20, 2018

(87) PCT Pub. No.: WO2017/222378
PCT Pub. Date: Dec. 28, 2017

(65) Prior Publication Data
US 2019/0245239 A1 Aug. 8, 2019

(30) Foreign Application Priority Data
Jun. 23, 2016 (EP) ...................................... 16176012

(51) Int. Cl.
*H01M 4/04* (2006.01)
*H01M 4/134* (2010.01)
(Continued)

(52) U.S. Cl.
CPC ......... *H01M 10/058* (2013.01); *H01M 4/045* (2013.01); *H01M 4/0452* (2013.01);
(Continued)

(58) Field of Classification Search
CPC .... H01M 4/045; H01M 4/0452; H01M 4/134; H01M 4/1395; H01M 4/366;
(Continued)

(56) References Cited

U.S. PATENT DOCUMENTS

2013/0149605 A1   6/2013   Kakehata et al.

FOREIGN PATENT DOCUMENTS

WO   WO 2015/126248 A1   8/2015

OTHER PUBLICATIONS

Ellis et al., "Three-Dimensional Self-Supported Metal Oxides for Advanced Energy Storage," Advanced Materials, vol. 26, No. 21, XP055223590, pp. 3368-3397 (Jun. 2, 2014).
(Continued)

*Primary Examiner* — Brittany L Raymond
(74) *Attorney, Agent, or Firm* — Leydig, Voit & Mayer, Ltd.

(57) ABSTRACT

A method of manufacturing a battery with a substrate current collector, wherein the method comprises: forming elongate and aligned electrically conductive structures on the substrate face with upstanding walls; wherein the walls are formed with a first electrode layer covering said walls, and a solid state electrolyte layer provided on the first electrode layer; and wherein a second electrode layer is formed by covering the electrolyte layer with an electrode layer; and forming a top current collector layer in electrical contact with the second electrode layer, wherein the second electrode layer is shielded from the conductive structure by an insulator covering a part of said conductive structure adjacent an end side thereof.

20 Claims, 10 Drawing Sheets

(51) Int. Cl.
| | |
|---|---|
| H01M 4/36 | (2006.01) |
| H01M 4/66 | (2006.01) |
| H01M 4/75 | (2006.01) |
| H01M 10/0525 | (2010.01) |
| H01M 10/0562 | (2010.01) |
| H01M 10/058 | (2010.01) |
| H01M 10/0585 | (2010.01) |
| H01M 10/052 | (2010.01) |
| H01M 4/70 | (2006.01) |
| H01M 4/1395 | (2010.01) |
| H01M 10/04 | (2006.01) |
| H01M 4/38 | (2006.01) |

(52) U.S. Cl.
 CPC ......... *H01M 4/134* (2013.01); *H01M 4/1395* (2013.01); *H01M 4/366* (2013.01); *H01M 4/382* (2013.01); *H01M 4/661* (2013.01); *H01M 4/70* (2013.01); *H01M 4/75* (2013.01); *H01M 10/0413* (2013.01); *H01M 10/0436* (2013.01); *H01M 10/052* (2013.01); *H01M 10/0525* (2013.01); *H01M 10/0562* (2013.01); *H01M 10/0585* (2013.01); *Y02T 10/7011* (2013.01)

(58) Field of Classification Search
 CPC ........ H01M 4/382; H01M 4/661; H01M 4/70; H01M 4/75; H01M 10/0413; H01M 10/0436; H01M 10/052; H01M 10/0525; H01M 10/0562; H01M 10/058; H01M 10/0585
 See application file for complete search history.

(56) References Cited

OTHER PUBLICATIONS

Porthault et al., "Electrodeposition of Lithium Metal Thin Films and Its Application in All-Solid-State Microbatteries," Electrochimica Acta, vol. 194, XP029462053, pp. 330-337 (Feb. 18, 2016).

European Patent Office, International Search Report in corresponding International Application No. PCT/NL2017/050417 dated Sep. 5, 2017 (3 pages).

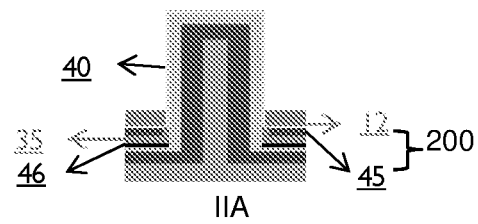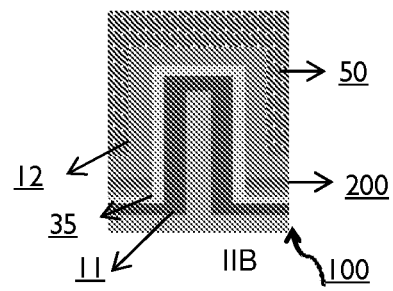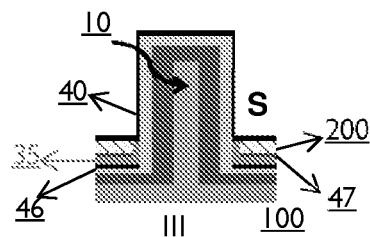
FIG 7
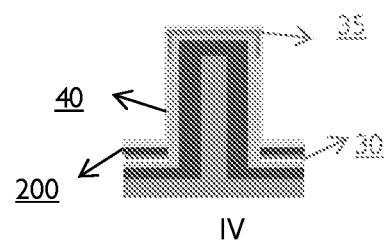

METHOD OF MANUFACTURING A LITHIUM BATTERY

CROSS-REFERENCE TO RELATED APPLICATIONS

This patent application is a U.S. National Phase of PCT International Application No. PCT/NL2017/050417, filed Jun. 22, 2017, which claims priority to European Application No. 16176012.9, filed Jun. 23, 2016, which are both expressly incorporated by reference in their entireties, including any references contained therein.

FIELD

The present invention relates to a method of manufacturing a Lithium battery for electrochemical or electro-optical devices.

BACKGROUND

For applications like portable electronics and automotive, e.g. for use in (hybrid) electric vehicles (EVs, PHEVs), battery systems are desired with optimal energy densities to provide minimal system weight and volume. To enable high energy densities, lithium metal based batteries (i.e. with lithium metal as anode) are appealing since the energy density of the metal can reach high levels of about 3800 mAh/g. U.S. Pat. No. 6,168,884 discloses a planar design of a lithium metal anode that is formed in-situ during initial charge by plating lithium on an anode current collector, which does not form inter-metallic compounds with lithium. The anode current collector is sandwiched between a solid state electrolyte and an overlying layer.

It is also known to have a rechargeable Li-ion solid-state battery with a current collector of non-planar design. Thin-film battery structures of known type are disclosed e.g. in WO2010032159, the contents of which are included by reference, wherein for example all-solid state compositions are deposited on 3D micro-patterned structures. In this respect, where early battery structures utilize liquid electrolytes, all-solid state compositions utilize electrolytes of a solid state type, which are inherently safer in use. In these structures a large variety of materials are and have been used for the respective electrodes for example as disclosed in US 20110117417.

DE102011121681 discloses a pillar geometry for a liquid electrolyte, wherein dendrites are prevented from forming on the pillar tops by isolating these. The pillars are extending in an electrolyte fluid or gel and distanced from a cathode sheet.

In discharging battery mode, the anode is the "negative electrode" to which the positive current flows, from the cathode, being the "positive electrode". During charge these functions are reversed. Irrespective charging mode, the electrochemical relationship may be characterized by charge exchange between a negative electrode material and a positive electrode material, the negative electrode material having a workfunction or redox potential that is lower than the workfunction or redox potential of the positive electrode material.

For example, known negative electrode (anode) materials are Li4Ti5O12 (LTO); LiC6 (Graphite); Li4.4 Si (Silicon) and Li4.4Ge (Germanium) known positive electrode (cathode) materials are LiCOO2 (LCO), LiCoPP4, (doped) LiMn2O4 (LMO), LiMnPO4, LiFePO4 (LFP), LiFePO4F (LFPF), LiCO1/3Ni1/3Mn1/3O2 (LCNMO), Sulphur or Sulphur based compounds like $Li_xS$.

Known (solid state) electrolytes might include Garnets such as Li7La3Zr2O12 (LLZO), Perovskites such as La0.57Li0.33TiO3 (LLTO), lithium iodide (LiI), lithium phosphate (Li3PO4) and lithium phosphorus oxynitride (Li-PON). In addition, lithium salts, such as LiPF6, LiBF4 or LiClO4 in an organic solvent, such as ethylene carbonate, dimethyl carbonate, diethyl carbonate, propylene carbonate are known to have a typical conductivity of about 10 mS/cm at RT. The electrolyte decomposes on initial charging and forms a solid layer called the solid electrolyte interphase (SEI).

Solid polymer separators like polyethylene oxide (PEO) may also be included, such polymers having transport capacity often due to having a lithium salt disposed therein as known in the state of the art. Work has also been performed with lithium and halide materials, particularly, in some examples, a lithium aluminum tetrahalide such as lithium aluminum tetrafluoride (LiAlF4).

Once such structures are made on a bendable metal foil, they can be manufactured in large-scale processes, e.g. a roll-to-roll process where the following can be done: 1) Coiling, winding or stacking it to increase the energy or power density per unit volume. 2) Integrating it on flexible devices like flexible displays, signage etc.

Although high-aspect ratio structures can be made in nanometer scale the height or depth of these high-aspect ratio structures need to be in the microns range for delivering enough charge capacity for the battery. The reason why these structures are preferred is due to the easy accessibility of their entire surface. In the prior art many methods to produce these are non-economical (e.g. involving silicon microfabrication and long-time electrodeposition). Moreover, to do any of these, the design of the stack is in need for optimization because otherwise while winding or flexing, the pillar structure could be damaged inhibiting proper electrochemical action of the device. Furthermore, it has come to the attention that existing solid state (e.g.) Li-based intercalation electrolytes induce stress in the high-aspect ratio structures that may limit lifetime and reduce the number of cycle periods. A challenge exists to minimize the relative amount of electrochemically inactive electronic current collectors without compromising on the rate performance. It is aimed to provide a method and structure for a 3D thin film battery design, having an all-solid state structure to provide a design with both inherent safety and high energy densities.

SUMMARY OF THE INVENTION

It is an object of the invention to provide a method for producing an electronic device having a current collector capable of a high specific charge collecting area and power, having a proper dimensioning but is also achieved using a simple and fast technique and resulting in a robust design.

To this end, according to an aspect a method is provided of manufacturing a battery with a substrate current collector, wherein the method comprises: forming elongate and aligned electrically conductive structures on the substrate face with upstanding walls; wherein the walls are formed with a first electrode layer covering said walls, and a solid state electrolyte layer provided on the first electrode layer; and wherein a second electrode layer is formed by covering the electrolyte layer with an electrode layer; and forming a top current collector layer in electrical contact with the second electrode layer, wherein the second electrode layer is shielded from the conductive structure by an insulator covering a part of said conductive structure adjacent an end side thereof. For example, an insulating cap shields the pillar top from direct electrical contact with a Lithium metal layer In another example, a base part of the pillar structure may be covered with in insulator.

The pillars function as current collectors for the battery structure in a laminate, which current collectors are electrically connected through a base substrate. Between adjacent pillars, an aspect ratio of a height dimension and the pillar interdistance, i.e. a length dimension normal to the walls coplanar along the base, is relatively high, that is, higher than 50, or even higher than 80 or even more than 100. In a typical arrangement, the pillars may have height dimensions, i.e. a height separating a base plane from a planar surface of about 25-200 micrometer, preferably 50-100 micrometer wherein the length dimensions, i.e. the length separating opposing pillars, can be in the order of 1-10 micrometer, preferably 2-4 micrometer. For such structures, the substrate as presently disclosed is electrically conductive with a surface area of the current collector that is significantly increased, which enhances the charge collecting capacity of the current collector. Moreover, for such structures, it is possible to apply a conformal multilayer coating without compromising the functionality of the multilayer coating. Examples of such functionality may be multilayers such as a battery multilayer or photovoltaic multilayer or single layer coatings.

In addition, according to an aspect of the invention, for such high-aspect ratio structures optimal current collecting performance may be provided in the form of a coated pillar wherein the high-aspect ratio structure comprises metal or metalized pillars having a radius of curvature larger than 50 nanometer. An aspect of improved performance is a trade-off that is found by a density of the high-aspect ratio structure demanding smaller pitches and the surrounding conformal coating. In this respect, electrode thicknesses in the battery multilayer may be varied and are correlated to match their volumetric storage capacities for Lithium-ions while charging and/or discharging. A known matching relationship is governed by a C-rate number, known in the art. A C-rate is a measure of the rate at which a battery is charged or discharged relative to its maximum capacity. For example the capacity of the electrode layers at a certain C-rate are matched by controlling layer thickness and material composition.

Another aspect of the invention is that a 'conformal coating' is a coating that may comprise a plurality of layers that at least conformally coat the pillars of the high aspect ratio structure. Furthermore, in this application, a 'first electrode layer' may be part of a laminate and may be a bottom layer, i.e. the layer with the smallest radius of curvature. The 'second electrode' may be used to indicate a top layer of a laminate, i.e. the layer with the highest radius of curvature. It is noted that a laminate is not essential, since the electrode structures may be merged into the collector structures as porous complex structures. In such embodiments, an electrolyte layer is provided between electrode structures that are combined with current collector structures.

It is noted that in US2009214956 a structure is proposed wherein electrolyte material is conformally coated onto conducting nanowires and wherein cathode material, in electrical connection with a second conductive material, is interpenetrated between electrolyte-coated nanowires.

With thickness is meant 'average thickness' which may render an equivalent function of a certain mathematical thickness. In the application, where layers are coated, it is intended that these coatings at their functional locations are substantially conformal, but this is not necessary, as long as a functional layer is designed to have a thickness where a tradeoff is reached between internal resistance, and energy density. In the specification, depending on context, functional layers may not be in direct contact with other functional structures, but may have intermediate layers or structures in between that may enhance functionality. In that respect, the skilled person will understand that where it is described, for example, that an electrode layer is 'a layer', 'in contact' with a charge collector, such would be interpreted as 'in electrical contact' not excluding a possible Lithium diffusion barrier layer, current collecting layer, process protection layer etc. enhancing functionality. This similarly counts for electrolyte layers 'in contact' with negative or positive electrode layers.

These and other aspects of the invention will be discussed in more detail with reference to drawings, wherein like reference numerals refer to like elements. It will be appreciated that the drawings are presented for illustrative purposes and may not be used for limiting the scope of the appended claims.

BRIEF DESCRIPTION OF THE DRAWINGS

FIG. 7 shows yet a further embodiment in cross sectional view according to an aspect of the invention;

DETAILED DESCRIPTION OF THE DRAWINGS

In the following examples in more detail aspects of the invention will be illustrated in the form of an electrochemical device, more specifically a battery device, for instance of a lithium ion type, more specifically having a 3D collector structure for enhancing the charge collecting specific area of the collector, that is in electrical contact with battery multilayer, in particular, a negative electrode layer thereof.

Figure 1A:
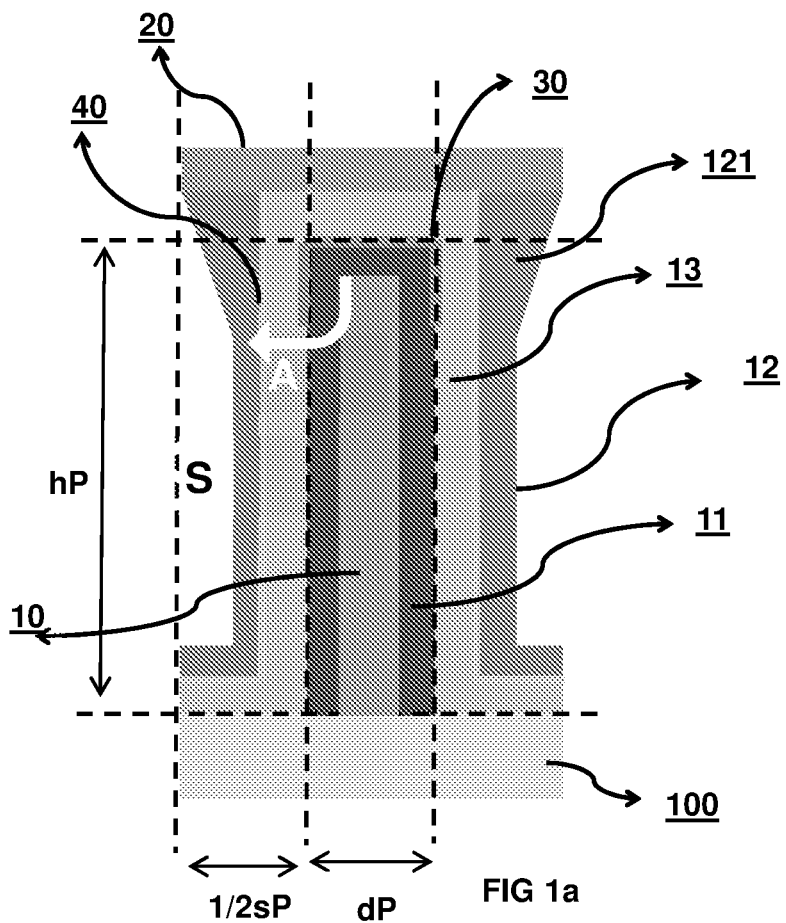
FIG. 1A shows a geometric structure of an embodiment in cross sectional view.

FIG. 1a shows a geometric structure of an embodiment in cross sectional view where electrically conductive pillars 10 are formed on the substrate face 100. A general challenge for batteries is to minimize the relative amount of electrochemically inactive electronic current collectors (CC) without compromising on the rate performance. The 3D structured bottom CC—e.g. pillars, holes or plates/trenches—imposes a relative large amount of inactive material in terms of volume and weight, as their dimensions (aspect ratios) are bound by technical limitations. In addition, for 2D-confined structures such as pillars a too small radius can force the bottom electrode to approach non-favorable dimensions, i.e.

a too thick layer with limited diffusion. Moreover, fabrication of very thin and high aspect ratio pillars is a processing challenge. The final spacing between pillars (after depositing 3DTFB stack) is typically filled with a top current collector 20.

Figure 1B:
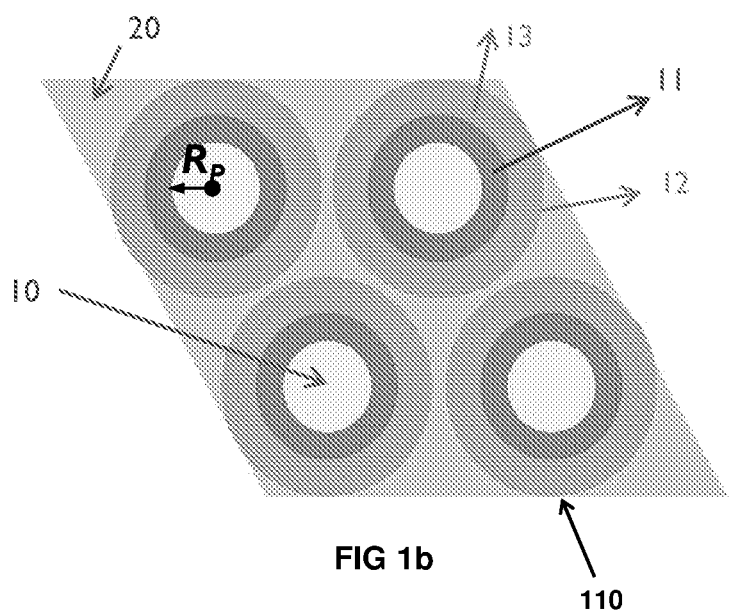
FIG. 1B the structure of FIG. 1A in planar view.

FIG. 1B shows the structure of FIG. 1A in planar view. In the figure, a single pillar 10 is shown as part of a structure of many pillars having an interdistance sP, e.g. with an interdistance sP between the pillar walls that ranges between 500-2500 nm.

The electronic device comprises electronic circuitry (not depicted) equipped with a current collector 100 formed by a metal substrate having a face forming a high-aspect ratio structure of pillars 10. The walls have for example, an aspect ratio larger than 10 or even larger than 50. The pillars can e.g. be formed by a micropattern mask, so that isolated micro pillars are formed. In the specification, the term pillars or micropillars is used to distinguish from 'dense' nanopillar structures. Such dense structures, in contrast may have elongate tubes having diameter dimensions smaller than 300, or even smaller than 50 or 10 nm and with interdistances d smaller than about several hundreds nm, e.g. in the range of 50-300 nm, which are too densely packed without sufficient gap for conformally coating multilayer stacks on them.

The micropillar structure may have pillar heights hP of more than 10 um, arbitrary elongate shapes and diameters dP at least larger than the said 10 nm, typically more than 100 nm and in this respect typically qualify as high aspect ratio structures. Herebelow, a pillar radius is therefor 0.5 dP.

In its simplest conceptualization, the battery device comprises two current collectors 10, 20, one that supplies electrons by virtue of an oxidation process occurring at an electrode layer, in the example termed the anode 12, and a second one that consumes electrons by virtue of a reduction process occurring at that electrode, termed the cathode 11. In discharging battery mode, the anode 12 is the "negative electrode" to which the positive current flows, from the cathode, being the "positive electrode". During charge these functions are reversed. Irrespective of charging mode, the electrochemical relationship may be characterized by charge exchange between a negative electrode material and a positive electrode material, the negative electrode material having a workfunction or redox potential that is lower than the workfunction or redox potential of the positive electrode material.

Thin film ion batteries, including those of the thin film solid state lithium ion type, can be prepared from various deposition techniques to fabricate negative electrode 12 (e.g. LMNO), positive electrode 11 (e.g. LTO), and electrolyte materials 13 (e.g. LIPON) bonded together to form a battery device. Such techniques may typically include depositing thin films of such materials using vacuum deposition or other techniques that result in similar thin films, to produce the "thin film" batteries. In the FIGS., a difference is marked between a coated pillar 110, and a 'bare' pillar 10, that forms the primary conductive structure on a planar surface 100.

Thin film batteries are often employed in applications in which space and weight may preferably be conserved and extremely long cycle life may be desired. The top current collector 20 could be any organic or inorganic material. It can for example have some other extra functionality such as a current collector and may optionally, be electroplated over the pillars after the active layers of the battery stack are deposited. Also, the current collector can be used as a planarizing top that planarizes the high-aspect ratio structure.

According to an aspect, second electrode 12 is formed by covering the electrolyte layer 13; and top current collector layer 20 is formed in electrical contact with second electrode 12, wherein the second electrode 12 is shielded from the conductive structure 10 by an insulator 30 covering a part of said conductive structure 10 adjacent an end side thereof. By shielding a part of the conductive structure, the (ion) current path between first and second electrode is directed away from the end parts of the conductive structure. This results in less electrochemical activity at the end arts of the conductive structure mitigating uneven expansions of the electrode materials, which can be typically formed by methods such as plating or intercalating or spray coating or gas phase deposition process.

According to a more specific aspect, as can be seen in FIG. 1, the second electrode layer 12 is formed by covering the electrolyte layer 13 with a Lithium metal; and the top current collector layer 20 is brought in contact with the Lithium metal layer 12. The Lithium metal layer 12 is shielded from the conductive pillar 11 by an insulating cap 30 that shields the pillar top from the Lithium metal layer 12 and directs a charge/discharge current path in lateral direction.

The pillar geometry 100 can be designed in such a way, that in fully plated condition of the anode (i.e. in charged condition of the battery) the Lithium metal is maximally expanded, while preventing radial stress against a neighbouring pillar 10.

Figure 1C:
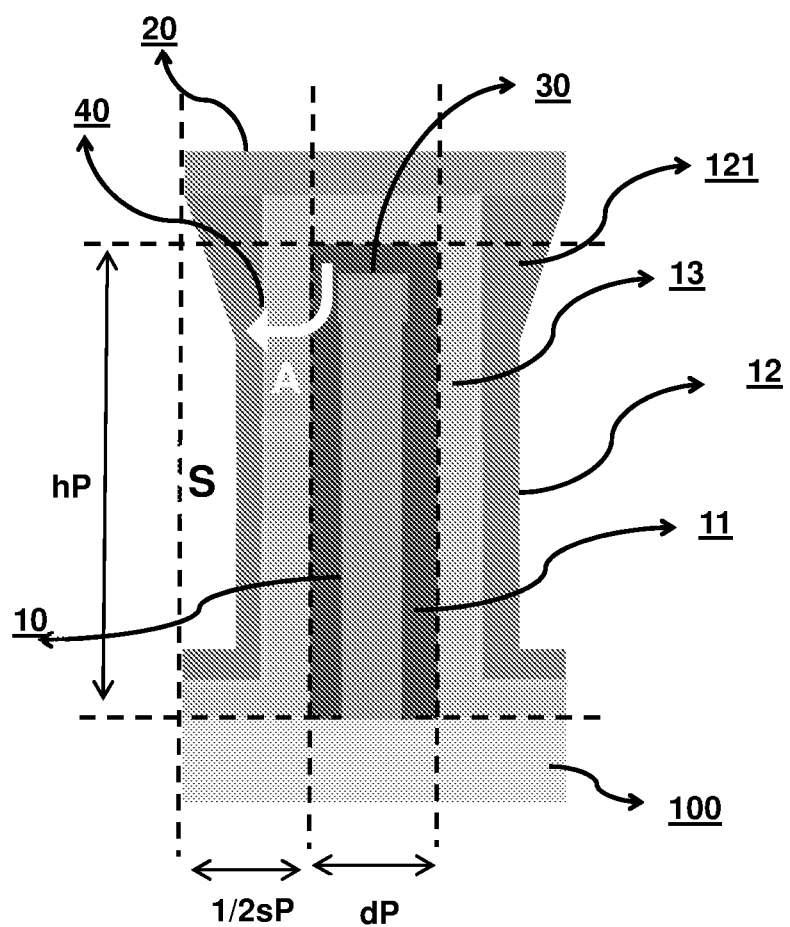
FIG. 1C shows an alternative geometric structure of an embodiment in cross sectional view.
Figure 2:
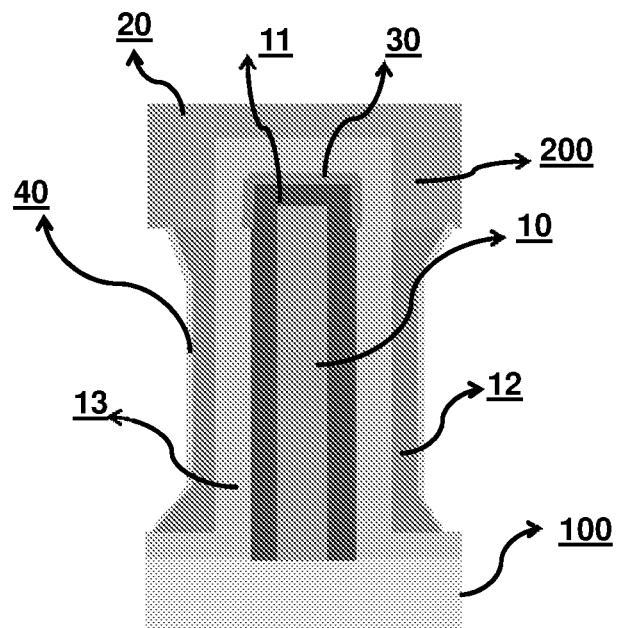
FIG. 2 shows a further embodiment in cross sectional view.

In order to prevent stress that could be built up by plating Lithium metal in the axial direction, the pillar top is isolated by a resistive thin layer 30 of substantial resistivity, e.g. formed by Al2O3 deposition, in order to block a direct conduction between the pillar top and the top current collector, which could cause Lithium ions to migrate in axial direction. By the resistive cap design Lithium ions substantially migrate in radial directions of the pillar, and form a substantially conformal electrode layer 12 that is electrically connected to the top current collector 20. In the shown Figure, the top current collector 20 is formed on top of the conductive structures partly covering the first electrode layer 11. Alternatively the barrier may be formed on top of the electrolyte layer 13 as illustrated in FIG. 2. In both cases the layer 30 should have a high resistivity against ion transport. Another approach is to form a resistive barrier layer 30 directly on the metal pillar 10, as can be seen in FIG. 1c. In that case the resistive layer blocks electron transport from the pillar 10 into the electrode 11, thereby it may redirect the electrochemical activity towards the lateral direction providing the electron conductivity of layer 11 is (substantially) lower than the ionic conductivity.

In that case a further advantage is provided of having excess Lithium 121 available near the pillar top, which favours an electrical connection with the top substrate. The resistive barrier accordingly decreases electrochemical activity at the top of the pillar 10. This, together with partial top current collector penetration and a lithium excess region, maximizes contact and minimizes the volumetric stresses in this region for better cycling stability.

The resistance of the barrier in such a way that lithium transport along that layer is preferred (Arrow A), so for a fully lithiated cathode 11 prior formation part of the lithium at the top diffuse towards the lower lying region during charge.

Interface seed layer 40 forms a thin conductive structure that covers the ionconductive—non electroconductive—electrolyte. Accordingly, Lithium metal layer 12 can be provided in a step of depositing seed layer 40 on the electrolyte layer, and plating the seed layer 40 in a metal plating process with a Lithium metal. This conductive seed layer 40 may be selectively deposed on side walls of the electrolyte layer 13, and may comprise e.g. Ni, Cu, Pd, Pt, Au, Ti or combinations thereof. Layer 40 may be relatively thin from a few nm provided by thin film electroless deposition or plating or ALD or CVD techniques to about 10 nm. Thicker seed layers are possible if they are permeable for Li-ions, later when the battery undergoes charging and discharging operations.

Interface seed layer 40 advantageously provides a direct electrical connection with top substrate 20. In one scenario, depicted here, the Lithium metal may be directly applied in a deposition process by using an external lithium source, which could involve a lithium metal counter electrode, and plating said compound using an liquid electrolyte bath, so that it plates on the electrolyte 13 via said seed layer 40.

FIG. 2 depicts another scenario, wherein a plating process may extract the Lithium metal from a Lithiated i.e. 'loaded' first electrode layer 14 by providing an electrical voltage between the current metal pillars 10 of collector 100 and top substrate 20, via the seed layer 40. Accordingly, the plating process extracts the Lithium metal 12 from the first electrode layer 11 by providing an electrical voltage between the metal pillars 10 and the seed layer 40—via top current collector 20. Note the difference with respect to the seed layer in FIG. 1, wherein the seed layer 40 remains in direct contact with the electrolyte 13, in contrast to the depicted scenario, wherein the seed layer 40 encloses the Lithium metal electrode layer 12. Moreover, in this embodiment, the seed layer could be from few nm to couple of 100 nm thick. In this way, a 'Lithium free' manufacturing process can be provided, wherein Lithium metal forming the anode layer, is provided by providing a voltage difference between top current collector 20 and substrate 100, respectively via seed layer 40 and pillars 10 and thereby charging the battery device. As a further enhancement, to provide faster and improved electrical contact, the top current collector 20 extends partly into the inter pillar region, i.e. the seed layer 40 extends partly into the top current collector 20. Accordingly, the top current collector layer 20 comprises extend parts 200 along the upstanding walls of pillar 10. Similarly, isolated pillar cap 30 may extend into the top current collector 20. The conductive layer 40 may be formed as a sacrificial layer, that disintegrates once the Lithium metal is plated with a thickness of e.g. 2-10 nm. It may also be formed as a current collector and scaffolding structure, for uniform plating at higher power, with a thickness of about 100 nm. Advantageously, the material 14 that is covered by the isolated cap 30 provides an excess of Lithium metal in the top current collector region.

Figure 3A:
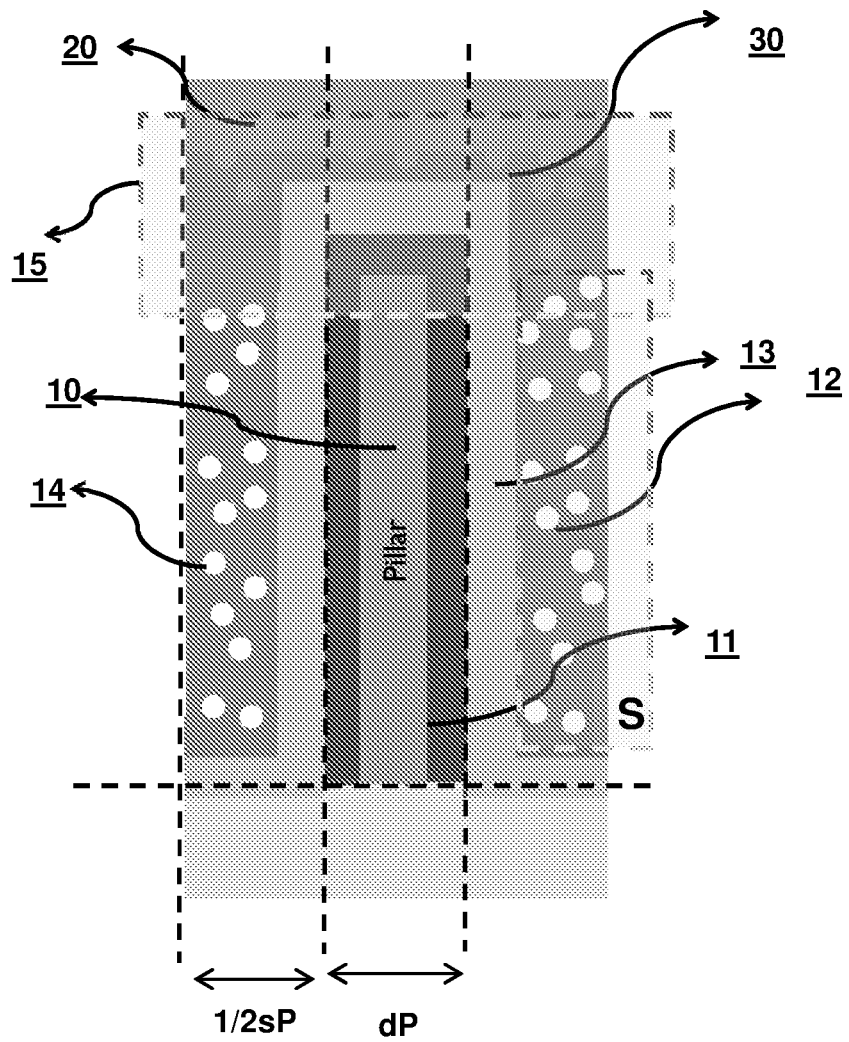
FIGS. 3A and 3B show further embodiments in cross sectional view according to an aspect of the invention.

FIG. 3a shows a further embodiment, wherein the Lithium metal is deposited as a transition structure 12 which may be partially porous, in such a way that it has improved electrical conductance near the top current collector, e.g. by an porous metal structure 15 extending from the top current collector 20 into the space between the pillars 10, and to accommodate lithium within the interpillar space S from a prelithiated cathode material during formation cycling. The porosity can be tuned e.g. by ramping up the charge speed after the film formation so far that diffusion limited transport is achieved, and dendritic-like lithium growth occurs.

Accordingly the top current collector layer extends along the upstanding walls alongside the insulating cap, defining a current flow away from the pillar top and providing a broadened electrical contact area with the top collector 20. By direct vapour deposition of the Lithium metal, a plating seed layer can be omitted. The techniques may be used in combination.

Figure 3B:
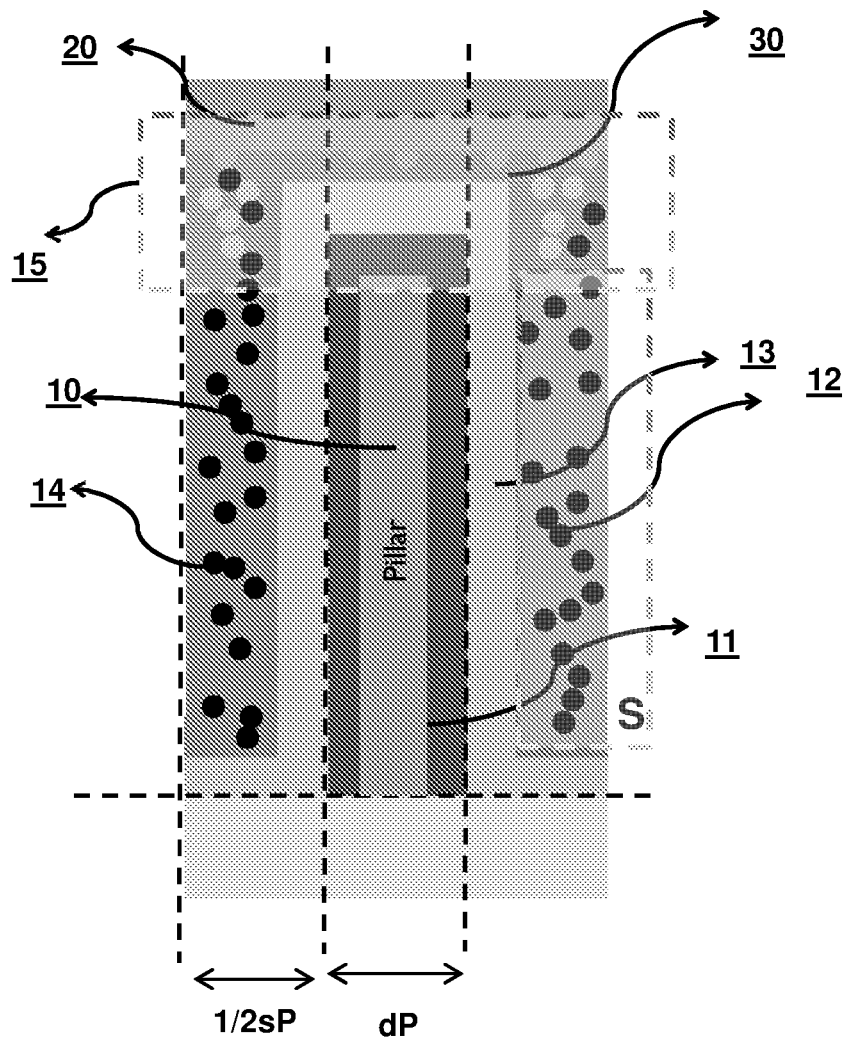

In another example shown in FIG. 3B, the Lithium deposition 12 may be arranged by using filler particles 14, so that the lithium structure is regulated in density and porosity along the height of pillar 10. This can provide enhanced and stable electrical contact with the topcurrent collector, which can be further enhanced by the porous structure 15, which could be also in the form of conductive particles. It also prevents stress and controlled use of the Lithium metal within the interpillar space S.

Accordingly, the interpillar space S separating adjacent conductive structures 10 is provided with a scaffolding structure 14, 15 so that the second electrode 12 and or top current collector 20 extends into the interspace structure, wherein said interspace structure comprises an electroconductive scaffold structure 14. For example anode layer 12 formed as a Lithium metal in plated condition, is partially (pre)filled with nanoparticles (just above the percolation threshold, so that the remaining space being (partially) filled with lithium metal. Such a nanoparticle may be a silicon nanoparticle, providing a hybrid anode. These particles may be formed with an electrically conductive shell. In another example, such filler particles may be Carbonaceous particles (e.g. Carbon Black) which may incorporated in a soft polymer matrix.

Figure 4:
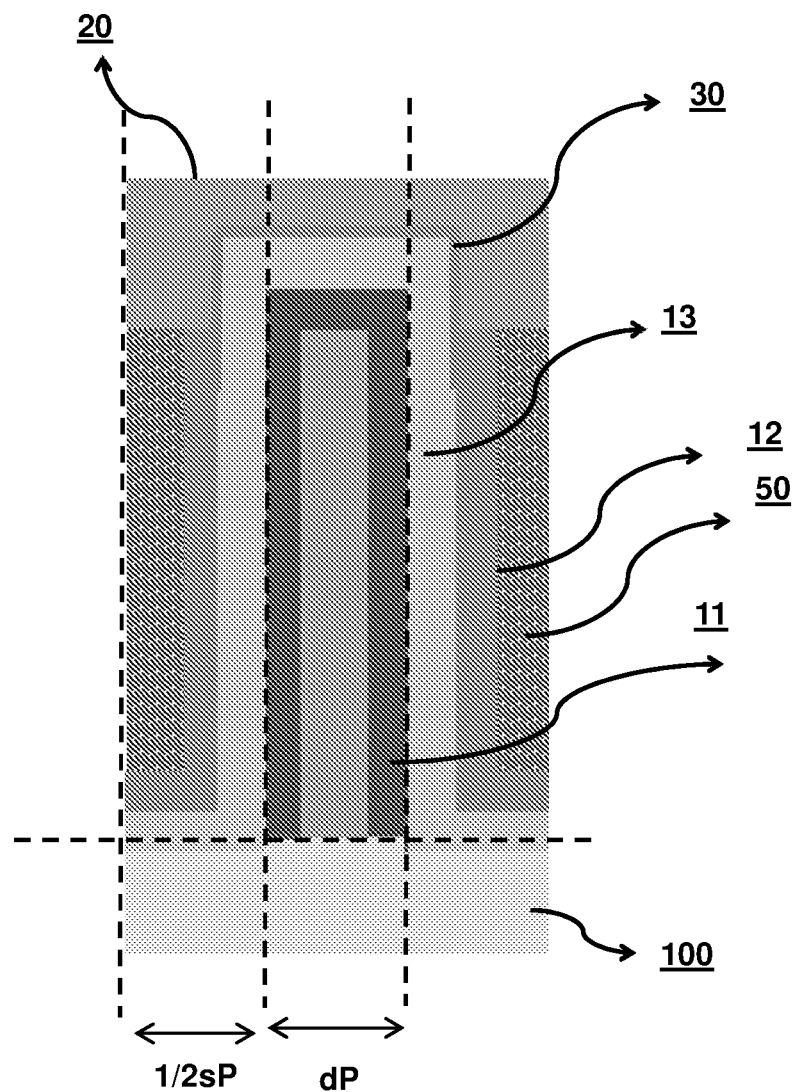
FIG. 4 shows yet a further embodiment in cross sectional view according to an aspect of the invention.

FIG. 4 shows a further enhancement, wherein said inter pillar space comprises a compression layer 50, that conforms to the second electrode. For a lithiated or loaded first electrode the said compression layer may be preferentially provided when the second electrode is Lithium depleted. The Lithium metal layer 12 is covered by a soft compression layer 50, which may accommodate stresses in the Lithium metal layer during charge and discharge. Especially with high C-rates such a layer is advantageous since it can exert a mechanical pressure similar to a 200 ring load on the anode layer 12 so as to accommodate large volume changes during the plating (battery charge) and stripping (battery discharge) of lithium metal. The layer 50 can be made of a compressible polymer, which may be a blend of polymer and electron conductive filler particles, so that a hybrid structure forms similar to FIG. 3.

In the following, exemplary process steps are given to provide a Lithium battery with a substrate current collector formed of pillars on a substrate face of elongate and aligned structures on the substrate face with upstanding walls; wherein the walls are formed with a first electrode layer covering said walls, and a solid state electrolyte layer provided on the first electrode layer; and wherein a second electrode layer is formed by covering the electrolyte layer with a Lithium metal. In a first process step a template substrate may be prepared with sacrificial template. This substrate can be for instance an aluminum or copper or silicon substrate. Pillars can be for instance made of a photoresist material, an aluminum oxide (AAO) layer, or a carbon nanotube/wire layer CNT/CNWs. These structures may be provided by a combination of process steps known to the skilled person. For example, in a first step, a pillar structure 100 is provided, e.g. by a templating process, wherein pillars are grown templates that can be lithographically provided, for instance, in an Al2O3 substrate, wherein holes are back etched, and pillars are formed by a plating step. Alternatively, the pillar structure may be provided by conductive nanotubes, e.g. carbon nano tubes or the like. In a second process step a smooth current collector layer may be deposited, e.g. Ni or Cu deposited by electroless plating or electroplating, or TiN by atomic layer deposition, which could be in the thickness range between 25 nm and 500 nm. Preferably, a 100 nm thickness of the deposited layer is provided to ensure that the structure is stiff enough even for high aspect ratio pillars (Ø>2 μm and >60 μm high). The base of the hollow pillars (i.e. the non-structured flat area) can be made thicker (~5 μm) for handling.

Next, in a further process step sacrificial substrate structures may be removed, e.g. by conventional etching steps, so that the current collector structure remains.

The term structure is here indicated to provide a combined function of current collectors and electrodes, either in conformal laminate or in a scaffolding geometry. Layer thicknesses of the two sides of coating are adjusted in such a way that an optimal trade-off between capacity and rate performance match is reached between the two layers. Practical thicknesses of the electrode layers therefore vary between 100-3000 nm, and may be even smaller when merged within the collectors.

Figure 5A:
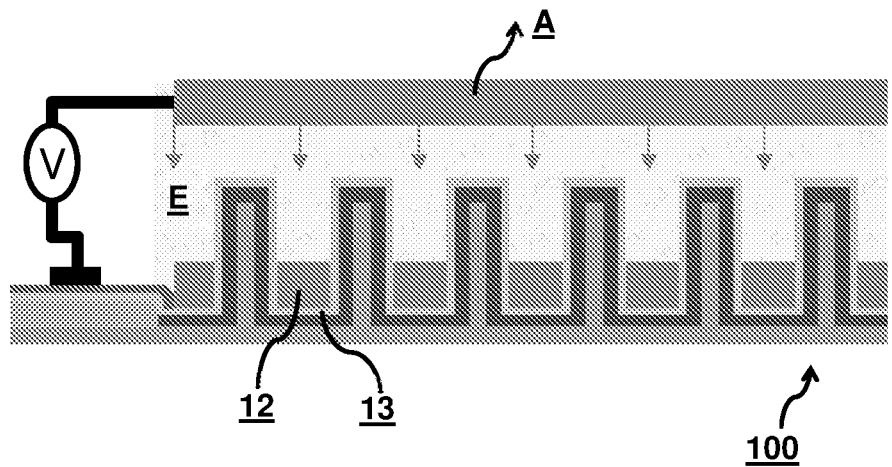
FIGS. 5A, B and C show exemplary process steps for forming a second electrode layer by covering the electrolyte layer with a Lithium metal.

FIG. 5A shows a Lithium deposition method, that can be provided by a two step process. In a first step an electrical voltage between a seed layer 12 and a counter electrode A is provided, that is separated from the seed layer by a liquid electrolyte E. The seed layer for 12 can be provided by lithium sputtering of the 3D structured battery foil 100. Alternatively a metal 40 can be chosen of e.g. Ni, Cu, Pd, Pt, Au, Ti or combinations thereof.

The sputtering process covers the solid state electrolyte layer 13 in the top and bottom parts of the battery foil 100. Accordingly the seed layer is provided as top layer exposed to the liquid electrolyte E. The counter electrode or electrolyte solution may acts as the lithium source as e.g. described in Henderson, "High rate and stable cycling of lithium metal anode", Nature Communications, February 2015, Volume 6, Article number 6362 and Takei, "Electrolytic deposition of lithium from non-aqueous solutions", Journal of Applied Electrochemistry September 1979, Volume 9, Issue 5, pp 587-593. By electrically connecting the bottom parts of the Lithium anode, the anode layer 12 can be grown from bottom to top.

Figure 5B:
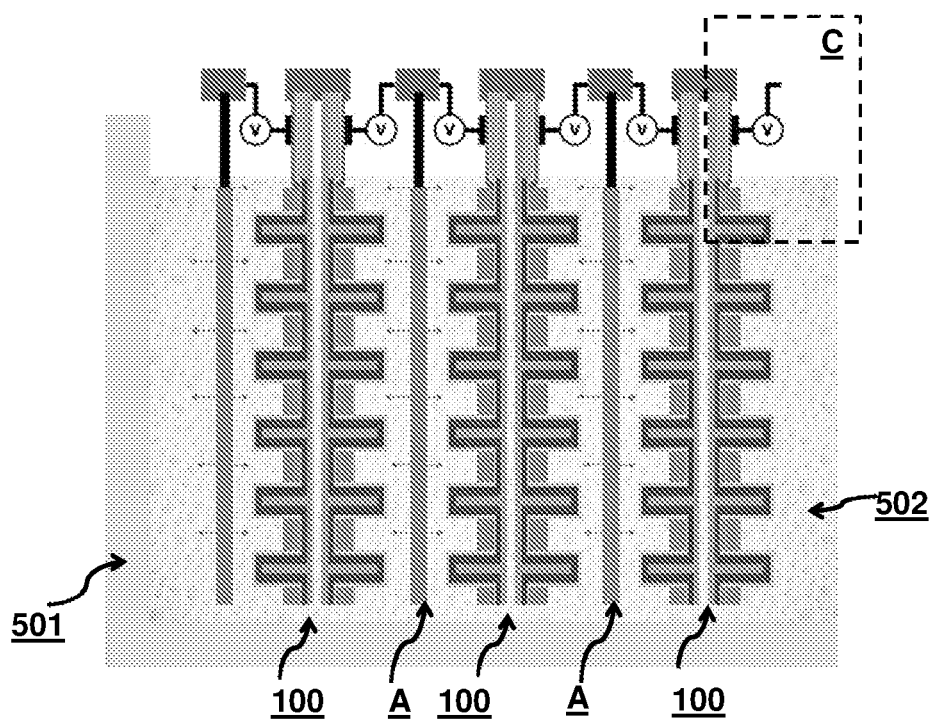

FIG. 5B shows a scaled up form, wherein the plating process is carried out for multiple two sided current collector structures that are electroplated by an opposed anodes. The foils are placed in a chemical bath 501 adjacent to counter electrode A. An electrolyte 502 provides ion conduction between the counter electrode and 3DTFB foil 100. The foil 100 is placed in such a way that only the area to be deposited is within the bath 501, matching with the position of counter electrode A. In this case, tuning of materials properties and geometries realizes the maximum possible conformal growth of the lithium layer onto the whole seed layer. This requires the electron transport kinetics through the seed layer 40 to be comparable with ion transport through the electrolyte. To achieve this, the electrolyte conductivity can be decreased (e.g. by decreasing salt concentration). Also, the charge rate can be decreased. Alternatively conformal growth can be obtained by formation cycling using the lithium in the cathode material. In this case the seed layer should just be able to transport electrons over the whole pillar surface, provided the charge rates are sufficiently low to avoid rate limitation by ohmic loss along the pillar.

Figure 5C:
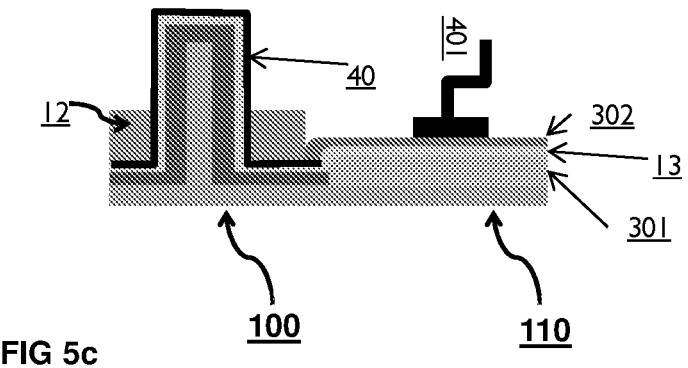

FIG. 5C shows a further scale up, wherein it can be seen that a voltage connection 401 is provided to battery foil 100 in the following manner. Connection arms 401 provide electrical contact with conductive layer 302 provided on top of a foil edge 110 and supply a voltage over conductive layer 302 and the counter electrode A. Conductive layer 302 contacts a seed layer 40 of about 1-10 nm of e.g. Ni, Cu, Pd, Pt, Au, Ti is deposited on the structure 100 to form a optionally sacrificial electron conduction path for plating of lithium onto the pillars. This seed layer 40 can be provided by electroless plating or e.g. atomic layer deposition to provide Cu or TiN deposition or other electron conducting layers, prior to providing a seed layer of Lithium e.g. by sputtering. The electron conductivity of the seed layer should be >10-3 S/cm. On foil edge 110 a relatively thick resist layer 301 is deposited to avoid shorts between the during pressure of the connection arm 401. The resist layer is covered with a conductive layer 302 contacting connection arm 401. The electrolyte in the bath can be continuously refreshed.

Figure 6:
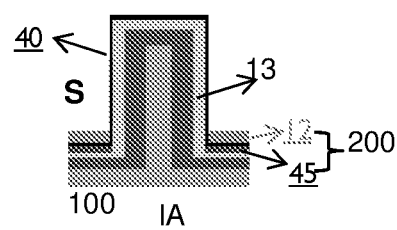
FIG. 6 shows yet a further embodiment in cross sectional view according to an aspect of the invention.
Figure 6:
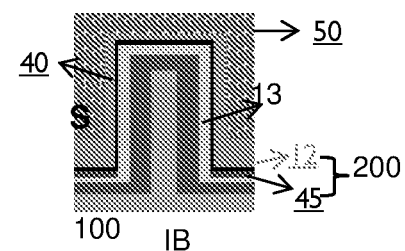

FIGS. 6 and 7 show a plurality of embodiments, wherein a second electrode layer 12 is formed by covering the electrolyte layer 13 with a Lithium metal; and forming a top current collector layer in electrical contact with the Lithium metal layer, wherein the Lithium metal 12 layer is shielded from the conductive structure by an insulator 30, 35 covering a part of said conductive structure adjacent an end side thereof. By a base-top collector 200, the Lithium anode layer 12, that growths during to battery charging, can simply expand away from the substrate 100.

FIG. 6 shows a first embodiment in steps IA, IB. In a first step, a thin (ca. 30-300 nm) conductive layer 45 (metal) is selectively deposited at the base of the interpillar region as a base conductor 45, to provide the electrical current path for electroplating in consecutive steps. This can for example be provided by evaporation wherein by proper tuning a negligible amount will be deposited on the side walls of the pillars. On top of the structure a thin seed layer 40 of about 1-10 nm (120) of e.g. Ni, Cu, Pd, Pt, Au, Ti is deposited to form an [optionally sacrificial] electron conduction path for plating of lithium onto the pillars. This can be provided by electroless plating or alternatively by atomic layer deposition, to provide a Cu, TiN or other electron conducting layers. Electron conductivity of the seed layer is preferably larger than 10-3 S/cm. Subsequently Lithium metal is deposited at the bottom of the interpillar region S. This layer 12 of typically a few um acts, together with metal 45 as top current collector 200, i.e. it is an excess amount of lithium that transport electrons along the foil direction and does not significantly interfere with cell charge/discharge. The deposition can be achieved by electroplating—by an external source using an electrolyte bath or by a directional deposition technique like evaporation. By tuning the electroplating process, selective growth of the lithium layer at the base of the interpillar structure can be provided, and not onto the [whole] seed layer 40. Selective—preferably conformal— growth is achieved if the ion transport kinetics through the electrolyte E is effectively faster than electron transport through the seed layer. This can be tuned by proper selection of the electrolyte (type, salt concentration, . . . ), the current rate of electroplating, and the combination of layer thickness and material type of the conductive layer 45 and seed layer 40. Conductive layer 45 may be omitted when the lithium layer 12 is evaporated in stead of plated. Also a combination is possible by cyclic plating.

Finally, it shows that the remaining interpillar space can be filled with a flexible material (polymer) 50 in the final embodiment IB. This is preferably carried out when the Lithium layer is entirely depleted into the cathode layer 11. Alternatively, the layer 50 can be may be made of a compressible electrolyte like a polymer Lithium ion conductive electrolyte e.g. a blend of polyethylene oxide PEO and a lithium salt LiX. This has the advantage that the compressible layer can be provided prior to Lithium depletion and can function as an electrolyte, e.g. via an external Lithium source that may be temporarily provided on top of the compressible layer 59.

FIG. 7 shows another embodiment in steps IIA, IIB. Here a top current collector 200 is provided at the base of the conductive structures with the insulator 35 shielding the top current collector from the substrate current collector 100.

In a first step, a thin (ca. 30-300 nm) conductive layer 46 (metal) may be selectively deposited at the base of the interpillar region S, to provide the electrical current path for electrodeposition in consecutive step e.g. by evaporation. Note that by evaporation the layer 46 will also be on top of the pillars, but by proper tuning to a negligible amount on the side walls of the pillars. Subsequently conductive seed layer 46 is used for electrodeposition of a barrier layer 35 at the base of the interpillar region. This insulator 35 (barrier layer) may further improve cycling stability by minimizing possible stresses due to electrochemical activity in the base part. The layer 35 has thickness of 20-200 nm and can partly cover the lower part of the pillar surface as well. Materials: e.g. Al2O3. Alternatively, the barrier layer 35 can be achieved by evaporation, in which case no seed layer 46 is necessary. On top of the barrier 35, a seed layer 45 for electroplating of lithium layer 12 may be deposited to form a top current collector 200 at the base of the conductive structures, similar to embodiment IA.

Finally, it shows that the remaining interpillar space can be filled with a flexible material (polymer) 50 in the final embodiment IIB. This is preferably carried out when the Lithium layer is entirely depleted into the cathode layer 11.

Embodiment III alternatively shows an additional seed layer 47 on top of barrier layer 35 for electrodeposition of top current collector 200 on the base of the interpillar region, typically a few microns thick. Seed layer 47 may be about 30-300 nm of e.g. Ni, Cu, Pt, Au, Ti deposited electrolessly. Alternatively TiN or other electron conducting layers with ALD. The top current collector 200 may be about 300 nm-5 um of e.g. electrodeposited Ni, Cu, Pt or Ti.

As an alternative, embodiment IV is shown with base-current collector 200 and both pillar end sides 30, 35 covered by isolator layers. In this embodiment, the Lithium layer is shielded from the conductive structure 100 by insulators 30, 35 covering a base part of said conductive structure 100, respectively an end side of pillar 10. This prevents stress build up due to plating processes of Lithium near the end parts of the pillar 10.

Figure 8:
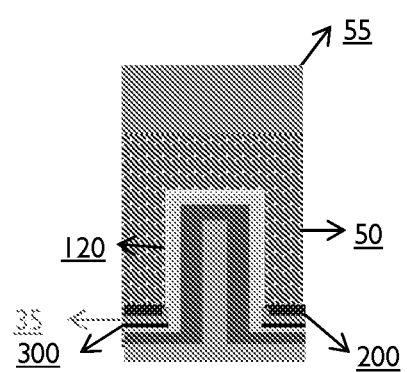
FIG. 8 shows further embodiments in cross sectional view according to an aspect of the invention.

FIG. 8 shows another embodiment V similar to IIA, but wherein the interpillar space is filled with a flexible material 50 prior to plating the second electrode 12 and wherein layer 50 is in direct contact with counter electrode 55 acting as lithium source. By connecting the external source 55 electrically with the top current collector 200 plating of the second electrode 12 may be achieved as illustrated by embodiment IIB. Afterwards, the remaining external Lithium source 55 layer may be removed.

Further examples are an insulator or barrier layer provided on any of the following:
1. On top of first cathode electrode 11
2. On top of electrolyte 13
3. On top of pillar 10
4. On top of second anode electrode 12

In case 1&2, the barrier layer blocks ion transport, directing ion transport away from the end parts of the conductive structure 10.

In case 3&4, the barrier layer blocks electron transfer into the electrode, directing electron transport away from the end parts of the conductive structure 10. This works particularly well in conjunction with electrode material(s) like LixTiO2 and LTO having limited electron conductivity compared to ion transport.

In an embodiment, no insulator barrier is provided in a method of manufacturing a battery with a substrate current collector, comprising: forming elongate and aligned electrically conductive structures on the substrate face with upstanding walls; wherein the walls are formed with a first electrode layer covering said walls, and a solid state electrolyte layer provided on the first electrode layer; and wherein a second electrode is formed by covering the electrolyte layer wherein an interspace structure is provided separating adjacent conductive structures so that the second electrode extends into the interspace structure; and forming a top current collector layer in electrical contact with the second electrode, wherein said interspace structure comprises a compression layer, that conforms to the second electrode, said compression layer provided when the second electrode is Lithium depleted or said compression layer comprising an Lithium ion conductive material to provide the second electrode.

In another embodiment a method is provided of manufacturing a battery with a substrate current collector, comprising: forming elongate and aligned electrically conductive structures on the substrate face with upstanding walls; wherein the walls are formed with a first electrode layer covering said walls, and a solid state electrolyte layer provided on the first electrode layer; and wherein a second electrode is formed by covering the electrolyte layer wherein an interspace structure is provided separating adjacent conductive structures so that the second electrode extends into the interspace structure; and forming a top current collector layer in electrical contact with the second electrode, wherein the top current collector is provided at the base of the conductive structures with an insulator shielding the top from the substrate current collector.

Examples of these thin-film batteries may be provided in an automobile, e.g. fabricated on the package or cover of automobile parts that use these batteries. Accordingly the metal substrate having the high aspect ratio structure may monolithically formed as a casing structure. There are other devices that have covers made of aluminium, where this concept may be applied. Alternatively a metal substrate may be stacked on an organic foil, i.e. containing a hydrocarbon content, for example, PEN, PET etc. or plastic mould structure. Even if the packages/covers of most of the devices today are moulded of plastic, still 10 s of micrometers of aluminium can be electroless plated by ionic liquids on plastics to create the battery on it or in it.

Optionally, in order to enable easy flexing, instead of having the pillars all over the substrate foil, isolated islands of pillar-clusters be patterned in a metal foil to form an integral part of it. In an example, the high aspect ratio clusters may span an area smaller than 10e4 micrometer2; and the planar zones may be are formed as strips having a width larger than 50 micrometer, although other ranges can be suitably used to the same effect of clustering to enable easy flexing. In order to make such batteries cost-effective, it is advantageous to transfer this technology to large area metal foils e.g. for roll-to-roll processing.

It will be appreciated that while specific embodiments of the invention have been described above, that the invention may be practiced otherwise than as described. In addition, isolated features discussed with reference to different figures may be combined.

The invention claimed is:

1. A method of manufacturing a battery with a substrate current collector, wherein the method comprises:
   forming an elongate and aligned electrically conductive structures on a substrate face with the electrically conductive structures having upstanding walls in relation to the substrate face; wherein the upstanding walls are formed with a first electrode layer covering said upstanding walls, a solid state electrolyte layer is provided on the first electrode layer; and wherein a second electrode is formed by covering the solid state electrolyte layer; and
   forming a top current collector layer in electrical contact with the second electrode,
   wherein the second electrode is shielded from the electrically conductive structures by an insulator covering a part of the electrically conductive structures adjacent an end side the electrically conductive structures to prevent an ion transport path between the first electrode layer and the second electrode, thereby mitigating stress build up near the end side of the electrically conductive structures.

2. A method according to claim 1, wherein the top current collector aye is formed on top of the electrically conductive structures on the substrate face.

3. A method according to claim 1, wherein the top current collector layer is provided at the base of the electrically conductive structures with the insulator shielding the top current collector from the substrate current collector.

4. A method according to claim 1, wherein the insulator partly covers the first electrode layer.

5. A method according to claim 1, wherein the second electrode is a Lithium metal layer.

6. A method according to claim 5 wherein the Lithium metal layer is provided by depositing a seed layer on the solid state electrolyte layer, and plating the seed layer in a metal plating process with a Lithium metal.

7. A method according to claim 6, wherein the plating comprises extracting the Lithium metal from the first electrode layer by providing an electrical voltage difference between the electrically conductive structures, which form metal pillars, and the seed layer.

8. A method according to claim 6, wherein the plating comprises providing an electrical voltage difference between the seed layer and a counter electrode that is separated from the seed layer; wherein the counter electrode and/or an electrolyte in contact with the seed layer comprise a Lithium source.

9. A method according to claim 1, wherein the top current collector layer extends along the upstanding walls.

10. A method according to claim 1, wherein an interspace structure is provided separating adjacent ones of the electrically conductive structures so that the second electrode extends into the interspace structure, wherein said interspace structure comprises an electroconductive scaffold.

11. A method according to claim 10, wherein the electroconductive scaffold is formed by a hollow or porous metal structure.

12. A method according to claim 10, wherein the electroconductive scaffold is formed of conductive nanoparticles.

13. A method according to claim 1, wherein an interspace structure is provided separating adjacent ones of the electrically conductive structures so that the second electrode extends into the interspace structure, wherein said interspace structure comprises a compression layer, that conforms to the second electrode, said compression layer being provided when the second electrode is Lithium that is depleted.

14. A method according to claim 1, wherein an interspace structure between ones of the electrically conductive structures comprises a compression layer, that conforms to the second electrode, said compression layer comprising a Lithium ion conductive material to provide the second electrode.

15. A battery with a substrate current collector, wherein the substrate current collector comprises elongate and aligned electrically conductive structures, on a substrate face of a substrate, with upstanding walls; wherein the upstanding walls are formed with a first electrode layer covering said upstanding walls, a solid state electrolyte layer is provided on the first electrode layer; and wherein a second electrode is formed by covering the solid state electrolyte layer; and
   wherein a top current collector layer is in electrical contact with the second electrode,
   wherein the second electrode is shielded from the electrically conductive structures by an insulator covering a part of the electrically conductive structures adjacent an end side of the electrically conductive structure to prevent an ion transport path between the first electrode layer and the second electrode, thereby mitigating stress build up near the end side of the electrically conductive structures.

16. The battery according to claim 15 wherein the electrically conductive structures comprise high-aspect ratio electrically conductive pillar structures having a radius of curvature larger than 50 nanometer.

17. The battery according to claim 16, wherein the pillar structures are higher than 10 micrometer.

18. The battery according to claim 15, wherein the substrate is a metal foil having both faces forming a high-aspect ratio structure.

19. The battery according to claim 15, having a plurality of current collectors, that are stacked in parallel or stacked in series.

20. The battery according to claim 15, wherein the substrate is a metal layer stacked on an organic foil.

* * * * *